Patented Nov. 10, 1931

1,831,689

UNITED STATES PATENT OFFICE

CHARLES E. SWETT, OF BOSTON, MASSACHUSETTS, ASSIGNOR, BY MESNE ASSIGNMENTS, TO BECKWITH MANUFACTURING COMPANY, OF BOSTON, MASSACHUSETTS, A CORPORATION OF MASSACHUSETTS

SHOE STIFFENER AND METHOD OF MAKING SAME

No Drawing. Application filed June 5, 1925. Serial No. 35,247.

This invention relates to shoe stiffeners adapted to be softened and made moldable and then to set in molded shape, and more particularly to box toes or box toe blanks. In the manufacture of such stiffeners, felt or other equivalent fabric as a foundation material, is impregnated or saturated with any one, or a combination of a variety of thermoplastic stiffening agents, such as asphalt, Montan wax, carnauba wax, rosin, or the like. After impregnation, the felt is allowed to cool and stiffen. It is then cut into blanks which may be finished by skiving on one or more edges. The finished blank when assembled with the upper of the shoe, is subjected to a moderate degree of heat, sufficient to soften the thermoplastic stiffening agent. The blank while in such soft or mouldable condition, together with the upper, is then moulded over a last, together with the upper of the shoe or, in ordinary parlance, is "lasted." The blank stiffens on cooling, and the shape of the toe of the upper is determined by the now stiffened blank.

As is quite obvious, one of the desired characteristics of a box toe stiffener is that it should be sufficiently resilient to resume its shape when a pressure applied thereto is removed. Another desirable characteristic is that it should not be softened by solar heat when the finished shoes are exposed to the sun in a shop window, in a warm climate. Hence this invention has for one of its primary objects to produce stiffeners of a more flexible or elastic character than heretofore produced. Another object is to produce stiffeners which are less likely to undergo deformation or sagging due to extreme solar heat or shrinkage of the upper. Other objects will appear as the description proceeds.

The foregoing objects, briefly stated, are attained by treating the felt or equivalent fabric, before impregnation with the thermoplastic stiffening agent, with rubber, for the purpose of locking or uniting the component fibers of the felt or fabric with an elastic or flexible bond, while preferably preserving the porosity of the felt for subsequent treatment. The treatment with rubber may then be followed by the usual impregnation with a stiffening agent.

The felt is preferably saturated by passing it through a bath of rubber in the form of a rubber suspension in water, the water forming a liquid vehicle therefor. The excess rubber is then removed as by passage through squeeze rolls, and the felt is dried. The rubber suspension may either be natural latex as obtained from the rubber tree, or an artificially prepared rubber suspension produced by dispersing crude or reclaimed rubber in water by the aid of a suitable dispersing agent. The rubber impregnated or rubberized felt may be dried with or without the application of heat, and after the elimination of the water, its constituent fibers are attached at multitudinous points with elastic joints and are coated or rubberized with a film of elastic rubber.

It is preferable to incorporate a vulcanizing agent, such as sulphur, and also an accelerator of vulcanization, into the rubber suspension. The rubber-impregnated felt may then be cured by heating under the usual time and temperature conditions. Or the rubber may be used in the form of a solution of rubber in a solvent, as for example, benzine, and a cold cure employed. When a rubber solution or suspension is used for impregnating the felt, it is applied in sufficiently dilute form so as to preserve the porosity of the fabric after which the liquid vehicle is removed.

The rubber-impregnated felt may then be impregnated with the thermoplastic material (such as the substances hereinbefore referred to, or suitable combinations thereof) in the usual manner, as by passing through a bath of the molten material, to impart the necessary stiffness to the felt upon the hardening of the material. The short time necessary for impregnation with the thermoplastic stiffening agent does not result in the solution of the rubber into the thermoplastic material to a material extent, especially when the rubber is cured. At the same time, the rubber is softened sufficiently on its surface so that a binding action takes place between the thermoplastic material and the rubber.

The felt is then cut up into the usual blanks, which may be skived on one or more edges. The rubber constituent, while still permitting the softening and moulding of a blank by moderate heating, allows a much greater range of flexure of the blank without cracking. The stiffener is also less subject to sagging when a shoe is exposed to extreme solar heat, or to deformation when the upper leather shrinks, because there is a moderate degree of stiffness which the rubber also imparts thereto.

The prefabricated sheet material is relatively stiff because of the presence of the cold and set thermoplastic stiffening agent in the pores and interstices thereof, and, as stated, is cut into blanks of appropriate sizes and shapes to serve as box toes or other stiffeners; and the blanks are skived along one or more edges. Each prefabricated blank is then ready for assembly with the upper, preliminary to the pulling over and lasting operations, so that the shoe manufacturer is enabled to use the stiffener without performing any operations thereon other than subjecting the stiffener to the application of heat.

While I have herein given certain preferred methods of procedure, I desire to have it clearly understood that, irrespective of how the impregnation with rubber and the subsequent impregnation with a stiffening thermoplastic agent of the fibrous foundation are effected, the resulting stiffener material is of a much superior character to a similar stiffener material without the rubber. It may further be stated that the same result is not secured by adding the rubber to and mixing it with the molten thermoplastic stiffening material, or otherwise subjecting it to such heat as to effect its de-polymerization. One of the important features is the locking of the fibers with rubber prior to the application of the thermoplastic stiffening material.

By a "rubber suspension" as used in the specification and in the appended claims, I mean a suspension of rubber particles in an aqueous or other liquid vehicle, whether a natural latex, or crude or reclaimed rubber or vulcanizable rubber compound artificially dispersed in water, or dissolved in a solvent.

By the expression "thermoplastic material" or "thermoplastic stiffening agent" as herein used, I mean a material which undergoes softening under the application of moderate heat, but which is sufficiently hard and rigid under normal conditions so as not to deform or flow.

What I claim is:

1. In the manufacture of shoe stiffeners, a process which comprises saturating fabric with rubber in a liquid vehicle, and thereby removing the vehicle leaving a rubberized fabric possessed of sufficient residual porosity to permit of saturation with molten rosin, and then saturating the rubberized fabric with a thermoplastic stiffening agent occupying the pores and interstices thereof and capable of being softened under the application of moderate heat and then setting.

2. In the manufacture of shoe stiffeners, a process which comprises saturating the fabric with rubber and a vulcanizing agent in a liquid vehicle, removing the vehicle and leaving a rubberized fabric possessed of sufficient residual porosity to permit of saturation with molten rosin, curing the fabric, and then saturating the porous rubberized fabric with a thermoplastic stiffening agent to fill the pores and interstices thereof.

3. In the manufacture of shoe stiffeners from fibrous material, a process which comprises saturating the material with an aqueous rubber suspension of sufficient dilution to effect bonding of the fibers by the rubber while maintaining sufficient residual porosity in the treated material to permit impregnation with molten rosin, and then impregnating the rubberized material with a molten thermoplastic stiffening agent to fill the pores thereof, whereby a prefabricated sheet is produced capable of being cut into stiff box toe blanks.

4. In the manufacture of shoe stiffeners from fibrous material, a process which comprises saturating such material with an aqueous rubber suspension, drying the material and curing the rubber absorbed thereby while restoring sufficient residual porosity thereto to permit of impregnation with molten rosin, and impregnating the dried material with a thermoplastic stiffening agent in a molten state.

5. A prefabricated stiff shoe stiffener adapted to be softened by the application of moderate heat comprising a porous rubberized fabric material having a thermoplastic stiffening agent distributed in the pores and interstices throughout the fabric, said thermoplastic agent being softenable under the application of moderate heat and setting to a hard and rigid state under normal conditions.

6. A prefabricated stiff shoe stiffener blank capable of being rendered limp by moderate heat and comprising a fibrous foundation the constituent fibers of which are united and coated throughout with rubber, and impregnated with a thermoplastic stiffening agent covering the coated fibers and filling the interstices between them, said thermoplastic agent being softenable under the application of moderate heat and setting to a hard and rigid state under normal conditions.

7. A resilient flexible sheet, capable of being softened by the application of moderate heat, comprising a carrier sheet impregnated with rubber, the impregnated sheet being impregnated with a rosin composition.

8. A process of making resilient flexible sheets, comprising the impregnating of a carrier sheet with rubber latex; drying; coating with liquid rosin composition; and cooling.

9. A process for making resilient flexible sheets, comprising the impregnating of a carrier sheet with rubber latex; drying; applying heat to the rubber; coating with liquid rosin composition; and cooling.

10. In the manufacture of shoe stiffeners, a process which comprises saturating a porous sheet fabric with rubber in a liquid vehicle, removing the vehicle to restore partially the porosity of the fabric, then saturating the porous rubberized fabric with a thermoplastic stiffening agent selected from a group consisting of asphalt, Montan wax, carnauba wax and rosin, to fill the pores and interstices thereof, and cutting shoe stiffener blanks therefrom.

11. A prefabricated stiff shoe stiffener adapted to be softened by the application of moderate heat and to be molded in softened condition and then setting, comprising a porous rubberized fabric carrying a thermoplastic stiffening material selected from a group consisting of asphalt, Montan wax, carnauba wax and rosin, distributed substantially uniformly throughout the body of the fabric.

In testimony whereof I have affixed my signature.

CHARLES E. SWETT.